US011590920B2

(12) United States Patent
Schneider et al.

(10) Patent No.: US 11,590,920 B2
(45) Date of Patent: Feb. 28, 2023

(54) SEAT-CENTRIC AIRBAG SYSTEM WITH PELVIS RESTRAINT CHAMBER

(71) Applicant: Autoliv ASP, Inc., Ogden, UT (US)

(72) Inventors: David W. Schneider, Waterford, MI (US); Harry Park, Rochester Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 121 days.

(21) Appl. No.: 17/030,147

(22) Filed: Sep. 23, 2020

(65) Prior Publication Data
US 2022/0089118 A1 Mar. 24, 2022

(51) Int. Cl.
*B60R 21/231* (2011.01)
*B60R 21/207* (2006.01)
*B60R 21/233* (2006.01)
*B60R 21/2338* (2011.01)

(52) U.S. Cl.
CPC ...... *B60R 21/23138* (2013.01); *B60R 21/207* (2013.01); *B60R 21/233* (2013.01); *B60R 21/2338* (2013.01); *B60R 2021/23146* (2013.01); *B60R 2021/23386* (2013.01)

(58) Field of Classification Search
CPC ............ B60R 21/23138; B60R 21/207; B60R 21/233; B60R 21/2338; B60R 2021/23146
See application file for complete search history.

(56) References Cited

U.S. PATENT DOCUMENTS

| | | | | |
|---|---|---|---|---|
| 9,016,718 B2 * | 4/2015 | Fukawatase | .......... | B60R 21/233 280/730.2 |
| 9,227,590 B2 * | 1/2016 | Fujiwara | ............... | B60R 21/207 |
| 9,592,788 B2 * | 3/2017 | Wiik | ...................... | B60R 21/233 |
| 10,336,283 B2 * | 7/2019 | Rickenbach | .......... | B60R 21/233 |
| 10,543,800 B2 * | 1/2020 | Kwon | ................... | B60R 21/207 |
| 10,543,801 B2 * | 1/2020 | Kwon | ................... | B60R 21/233 |
| 10,870,405 B2 * | 12/2020 | Kwon | ............... | B60R 21/23138 |
| 11,155,232 B2 * | 10/2021 | Moon | ............... | B60R 21/23138 |
| 11,180,102 B1 * | 11/2021 | Jaradi | ............... | B60R 21/01554 |
| 11,208,068 B2 * | 12/2021 | Kim | .................. | B60R 21/23138 |
| 2006/0131847 A1 * | 6/2006 | Sato | .................. | B60R 21/23138 280/730.2 |
| 2008/0174093 A1 * | 7/2008 | Inoue | ................. | B60R 21/23138 280/730.2 |

(Continued)

FOREIGN PATENT DOCUMENTS

KR    10-2020-013765    * 11/2020

OTHER PUBLICATIONS

Dae et al. KR 2020-0130765 Airbag apparatus of vehicle, Machine English Translation, ip.com (Year: 2020).*

*Primary Examiner* — Karen Beck
(74) *Attorney, Agent, or Firm* — Matthew D. Thayne; Thayne and Davis LLC

(57) ABSTRACT

Seat centric airbag restraint systems having pelvis restraint features, along with related methods. In some implementations, a first seat-mounted airbag cushion may be deployed along a first side of a vehicle occupant and a second seat-mounted airbag cushion may be deployed along a second side of the vehicle occupant. A first pelvis restraint chamber may be deployed below the first seat-mounted airbag cushion at an angle relative to the first seat-mounted airbag cushion and towards a first upper thigh of the vehicle occupant. The first pelvis restraint chamber may inhibit forward translation of the vehicle occupant within a vehicle seat by tensioning the pelvis region of the occupant.

20 Claims, 4 Drawing Sheets

(56) References Cited

U.S. PATENT DOCUMENTS

| | | | | |
|---|---|---|---|---|
| 2013/0093224 A1* | 4/2013 | Dainese | ................ | B60R 21/207 |
| | | | | 297/216.12 |
| 2013/0328294 A1* | 12/2013 | Fukawatase | ........ | B60R 21/2334 |
| | | | | 280/730.2 |
| 2016/0200278 A1* | 7/2016 | Wiik | ................... | B60R 21/2342 |
| | | | | 280/730.2 |
| 2017/0259774 A1* | 9/2017 | Matsushita | ............. | B60R 22/00 |
| 2018/0118150 A1* | 5/2018 | Kwon | ................... | B60R 21/207 |
| 2019/0161050 A1* | 5/2019 | Schneider | ......... | B60R 21/23138 |
| 2019/0275974 A1* | 9/2019 | Yetukuri | ............... | B60R 21/231 |
| 2020/0384941 A1* | 12/2020 | Kwon | ................... | B60R 21/207 |
| 2021/0122325 A1* | 4/2021 | Hwangbo | ............. | B60R 21/239 |
| 2021/0316695 A1* | 10/2021 | Matsushita | ....... | B60R 21/23138 |
| 2022/0073027 A1* | 3/2022 | Hwangbo | ........... | B60R 21/2338 |

* cited by examiner

SEAT-CENTRIC AIRBAG SYSTEM WITH PELVIS RESTRAINT CHAMBER

SUMMARY

Many vehicle environments lack sufficient pelvis restraint that may be provided by, for example, knee bolsters and/or toe pans. Autonomous vehicles or vehicles with highly autonomous functions, such as highly automated driving (HAD) vehicles are particularly prone to having poor pelvis restraint. Thus, some restraint/safety systems designed for such vehicles may be particularly prone to restrain occupants.

For example, some systems deploy airbag cushions from the seat itself, rather than from a steering wheel or adjacent vehicle panel. Such systems may deploy belts known as "wrap-around belts" to provide a reaction surface to keep the airbags adjacent to the occupant during inflation. However, such systems are often prone to allowing the occupant's pelvis to shift forward during certain impact events, such as frontal impacts, particularly when the occupant is not restrained to the seat by a common seatbelt. This is due to the lack of sufficient restraint of the occupant's pelvis region during inflation.

The present inventors have therefore determined that it would be desirable to provide apparatus, systems and methods that overcome one or more of the foregoing limitations and/or other limitations of the prior art. In some embodiments, the inventive concepts disclosed herein may therefore provide a cushion specifically configured to provide for the pelvis restraint often lacking in seat-mounted airbag cushions systems. In some embodiments, this restraint may be provided by way of one or more pelvis restraint chambers, which may in some embodiments be fluidly coupled with primary chambers of airbag cushions configured to inflate on opposing sides of the vehicle occupant's chest.

In a more particular example of a seat-mounted airbag assembly, the assembly may comprise a first lateral cushion configured to deploy from a first side of a vehicle seat. The assembly may further comprise a first belt coupled with the first lateral cushion and configured to tension the first lateral cushion during deployment. The assembly may further comprise a second lateral cushion configured to deploy from a second side of the vehicle seat opposite the first side, along with a second belt coupled with the second lateral cushion and configured to tension the second lateral cushion during deployment. The assembly may further comprise one or more pelvis restraint inflation chambers configured to inhibit forward translation of a vehicle occupant within the vehicle by engagement with at least one of the vehicle occupant's upper thighs and/or pelvis region. In preferred embodiments, there are two pelvis restraint inflation chambers, one configured to contact each of the upper legs of the occupant.

In some embodiments, the pelvis restraint inflation chamber may be configured to inflate between the upper thigh/pelvis region of an occupant in a vehicle seat and a primary inflation chamber of an airbag cushion.

In some embodiments, the pelvis restraint chamber may be fluidly coupled or otherwise operably coupled with at least one of the first and second lateral cushions.

Some embodiments may further comprise one or more features configured to facilitate desired inflation characteristics, such as internal and/or external tethers or a pleat. For example, in some embodiments, one or more external tethers may be coupled between the pelvis restraint inflation chamber and at least one of the first and second lateral cushions, which may allow the pelvis restraint chamber(s) to extend from the primary chamber(s) at a desired angle, such as along the upper thigh of the occupant. In some such embodiments, the external tether may be configured to direct deployment of the pelvis restraint inflation chamber at an angle relative to the at least one of the first and second lateral cushions.

Some embodiments may further comprise an internal tether coupled between the pelvis restraint inflation chamber and at least one of the first and second lateral cushions. The internal tether(s) may be configured to direct deployment of the pelvis restraint inflation chamber at an angle relative to the at least one of the first and second lateral cushions.

Some embodiments may further comprise a pleated region that may further facilitate bending of the pelvis restraint inflation chamber as desired. For example, gathered fabric may be sewn together in a specific location to reduce the length on one side in order to provide an angle between the lateral chamber and the pelvis restraint chamber.

Some embodiments may further comprise a second pelvis restraint inflation chamber, wherein the pelvis restraint inflation chamber is configured to deploy against a first upper thigh of the vehicle occupant, and wherein the second pelvis restraint inflation chamber is configured to deploy against a second upper thigh of the vehicle occupant.

In an example of a seat-mounted airbag assembly according to other embodiments, the assembly may comprise a first lateral cushion configured to deploy from a first side of a vehicle seat and a second lateral cushion configured to deploy from a second side of the vehicle seat opposite the first side. The assembly may further comprise a first pelvis restraint cushion configured to deploy from the first side of the vehicle seat, wherein the first pelvis restraint cushion is operably coupled with the first lateral cushion, and wherein the first pelvis restraint cushion is configured to inhibit forward translation of a vehicle occupant within the vehicle by engagement with a first of the vehicle occupant's upper thighs and/or pelvis region. The assembly may further comprise a second pelvis restraint cushion configured to deploy from the second side of the vehicle seat, wherein the second pelvis restraint cushion is operably coupled with the second lateral cushion, and wherein the second pelvis restraint cushion is configured to inhibit forward translation of the vehicle occupant within the vehicle by engagement with a second of the vehicle occupant's upper thighs and/or pelvis region.

In some embodiments, the first pelvis restraint cushion may be configured to deploy at an angle relative to the first lateral cushion.

In some embodiments, the first pelvis restraint cushion may comprise an inflation chamber of the first lateral cushion. The second pelvis restraint cushion may also be configured to deploy at an angle relative to the second lateral cushion and/or may comprise an inflation chamber of the second lateral cushion.

Some embodiments may further comprise means for angling a pelvis restraint cushion relative to a lateral cushion, such as a pleated elbow or other pleated region formed along a region joining the first and second pelvis restraint cushions and the first and second lateral cushions, one or more external tethers, and/or one or more internal tethers.

Some embodiments may, for example, comprise a first tether or set of tethers coupled between the first pelvis restraint cushion and the first lateral cushion a second tether or set of tethers coupled between the second pelvis restraint cushion and the second lateral cushion.

In an example of a method for restraining forward translation of a vehicle occupant during an impact event according to some implementations, the method may comprise deploying a first seat-mounted airbag cushion along a first side of a vehicle occupant and deploying a second seat-mounted airbag cushion along a second side of the vehicle occupant. A first pelvis restraint chamber may be deployed below the first seat-mounted airbag cushion at an angle relative to the first seat-mounted airbag cushion and towards a first upper thigh of the vehicle occupant. The first pelvis restraint chamber may inhibit forward translation of the vehicle occupant within a vehicle seat during deployment.

Some implementations may further comprise deploying a second pelvis restraint chamber below the second seat-mounted airbag cushion at an angle relative to the second seat-mounted airbag cushion and towards a second upper thigh of the vehicle occupant.

In some implementations, the first and second pelvis restraint chambers may deploy towards one another and/or towards a respective thigh of the vehicle occupant.

In some implementations, a single inflator may be used to inflate both the first seat-mounted airbag cushion and the first pelvis restraint chamber.

In some implementations, the steps of deploying the first seat-mounted airbag cushion and/or deploying the second seat-mounted airbag cushion may be performed prior to deploying the first pelvis restraint chamber. For example, in some implementations, one or both of the seat-mounted airbag cushions may deploy/inflate, the deployment/inflation of which may inflate one or both of the pelvis restraint chambers thereafter as a subsequent inflation stage.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
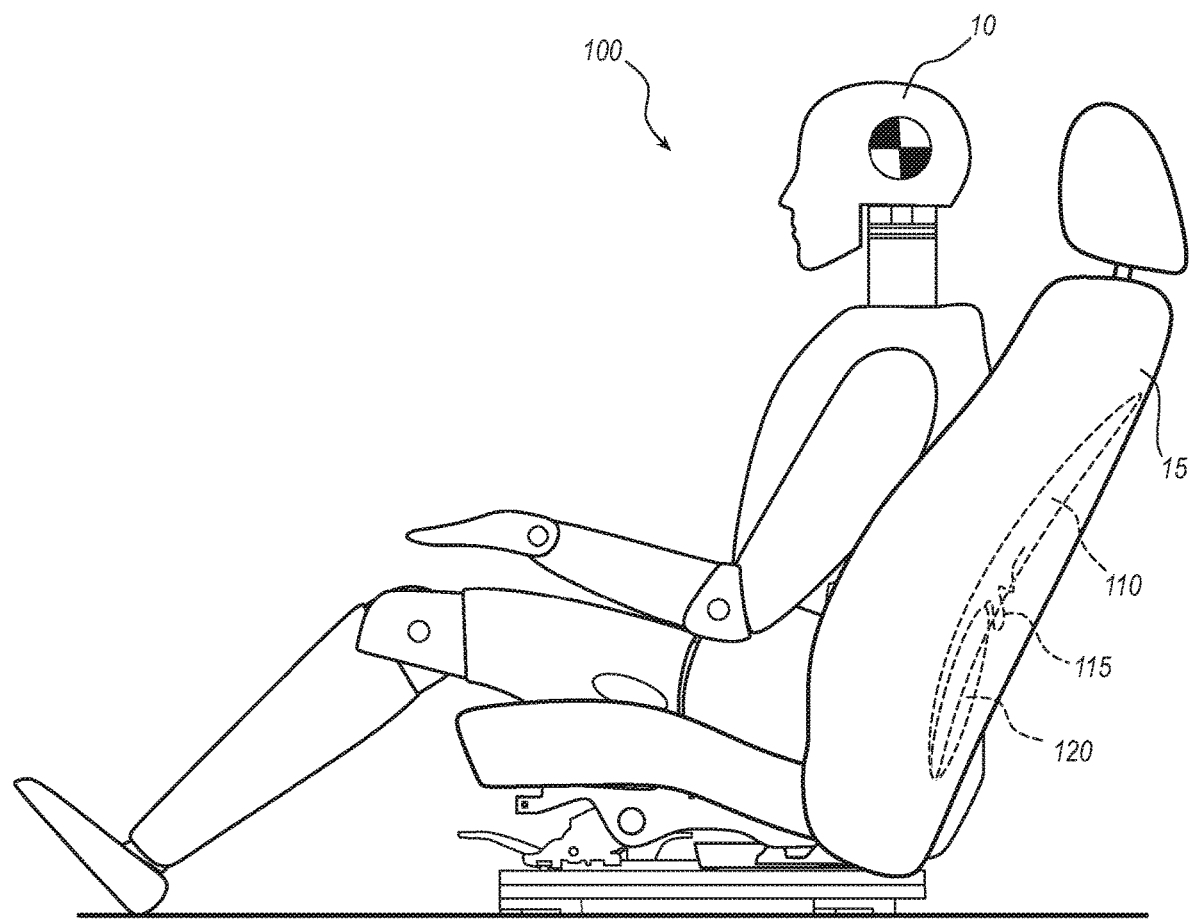
FIG. 1 is a side elevation view of a seat-mounted airbag cushion system having pelvis restraint according to some embodiments.

FIG. 1 depicts seat-centric airbag system 100 according to some embodiments. In certain preferred embodiments, system 100 may be used in a vehicle environment lacking effective pelvis restraint, such as restraint from a knee bolster and/or toe pan. For example, in some embodiments, system 100 may be installed in an autonomous or highly automated driving (HAD) vehicle.

System 100 comprises a pair of airbag cushions configured to be deployed from, or from a position adjacent to, a vehicle seat 15 for a vehicle occupant 10, such as from behind vehicle seat 15, as shown in FIG. 1. Each of these cushions comprises a primary chamber 110 and a secondary or pelvis chamber 120. Preferably, primary chamber 110 and pelvis chamber 120 are fluidly coupled with one another so that they deploy together and can be inflated using a single inflator.

Figure 2:
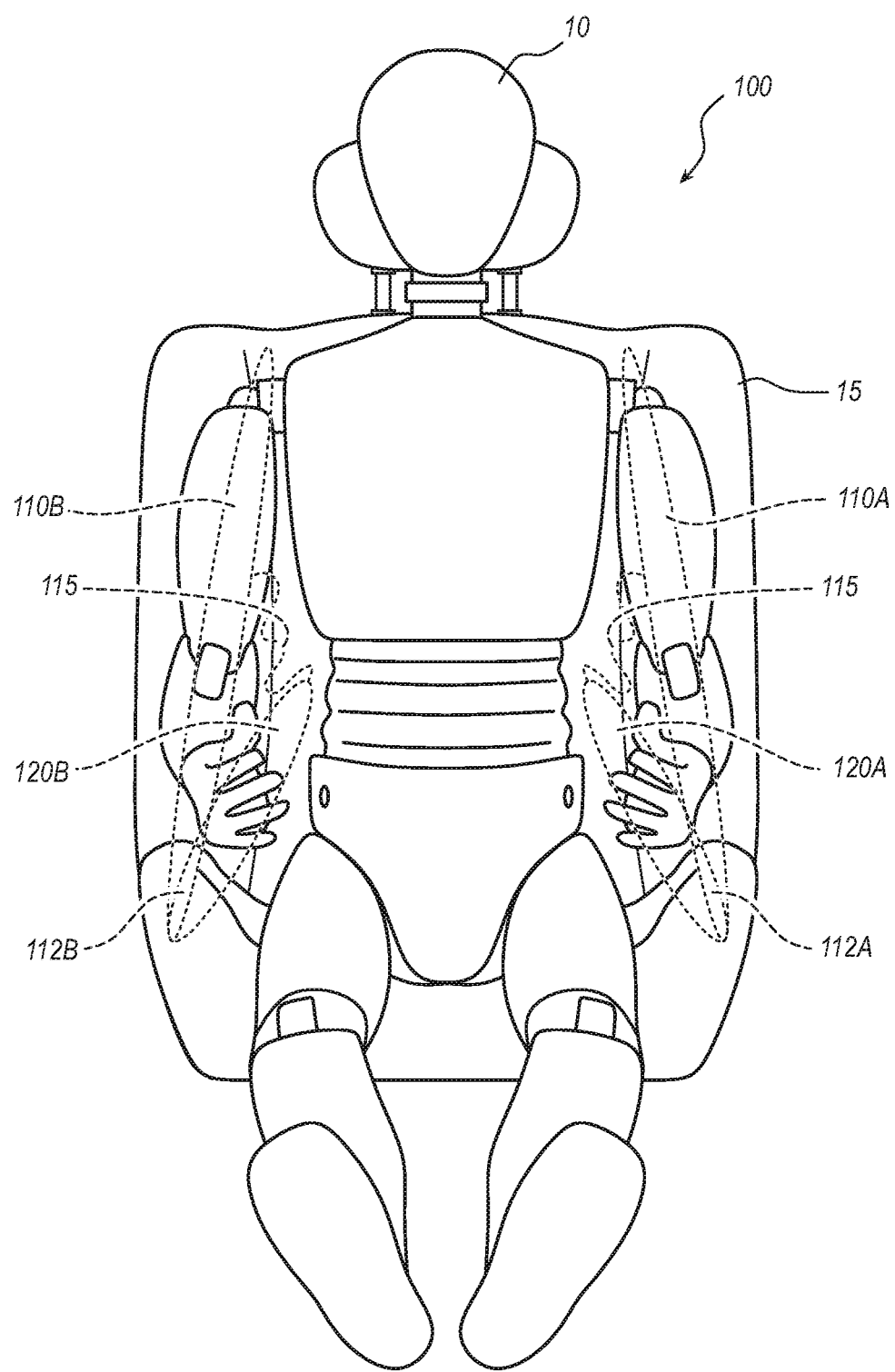
FIG. 2 is a front elevation view of the seat-mounted airbag cushion system prior to deployment.

FIG. 2 depicts a front view of vehicle seat 15 and seat-centric airbag system 100 prior to deployment. As shown in phantom in this figure, system 100 may comprise cushions configured to deploy from both sides of the seat 15 and occupant 10. More particularly, a first primary chamber 110A extends along a first side of occupant 10 and seat 15 and a second primary chamber 110B extends along a second side of occupant 10 and seat 15 opposite the first side. Both cushions further comprise a secondary or pelvis chamber fluidly coupled with the primary chamber. Thus, secondary/pelvis chamber 120A extends from a distal/bottom end of primary chamber 110A and secondary/pelvis chamber 120B extends from a distal/bottom end of secondary/pelvis chamber 110B.

As shown in FIG. 2, in the initial, pre-deployment position, the secondary/pelvis chambers 120A/120B may be folded upwards and inwards relative to occupant 10 towards the occupant centerline in order to ensure that inflation takes place in the proper direction to preferably provide pelvis restraint during inflation to prevent or at least inhibit occupant 10 from sliding forward, potentially off of seat 15 during certain impact events, such as particularly frontal impact events.

Various features may be provided to ensure that the secondary/pelvis chambers 120 deploy in a proper manner in order to provide the aforementioned restraint by deploying against the occupant's upper thigh and/or pelvis area. For example, in some embodiments, including the one depicted in FIG. 3, external tethers 115 may be provided between each primary and secondary/pelvis restraint chambers of the assembly. Thus, a tether 115 is coupled between each of the distal ends of secondary/pelvis chambers 120A and 120B and extend to a portion of an associated primary chamber 110A/110B. Preferably, these tethers 115 are long enough to maintain a desired angle between a primary chamber 110 and an adjacent secondary/pelvis chamber 120 to ensure that each secondary/pelvis chamber 120 deploys adjacent to the upper leg and pelvis region of occupant 10.

In some embodiments, tack/tear stitching or the like may be used, either in addition to or potentially as an alternative to using tethers 115. For example, in some embodiments and implementations, each of the secondary/pelvis chambers 120 may be folded against its corresponding primary chamber 110 so that the distal/bottom end of each secondary/pelvis chamber 120 extends partially back towards the top end of the primary chamber 110. In some embodiments, this bend may be positioned at or around the pelvis area of the adjacent occupant 10.

As another example of means for angling a secondary chamber away from a primary chamber of an airbag cushion and/or for providing a reactionary chamber that deploys against an upper leg/femur and/or pelvis area of an adjacent seat occupant to provide pelvis restraint and/or provide a secondary airbag reaction surface for inflation of primary chambers coupled to the reactionary/secondary airbags, in some embodiments, pleats and/or internal tethers may be formed along the elbow or bend regions 112 formed between primary chambers 110 and secondary chambers 120.

Thus, for example, as depicted in FIG. 2, a bend region 112A is formed between primary chamber 110A and secondary chamber 120A and a similar bend region 112B is formed between primary chamber 110B and secondary chamber 120B on the opposite side. This may create a bend that, during inflation, may allow for deployment against the pelvic region and/or upper thigh of occupant 10 to provide enhanced restraint, particularly when occupant 10 is not wearing a seatbelt. Bend regions 112A and 112B may also, or alternatively, include one or more internal tethers to provide the desired bend and ensure proper deployment and restraint against the occupant's upper leg and/or pelvis area.

Figure 3:
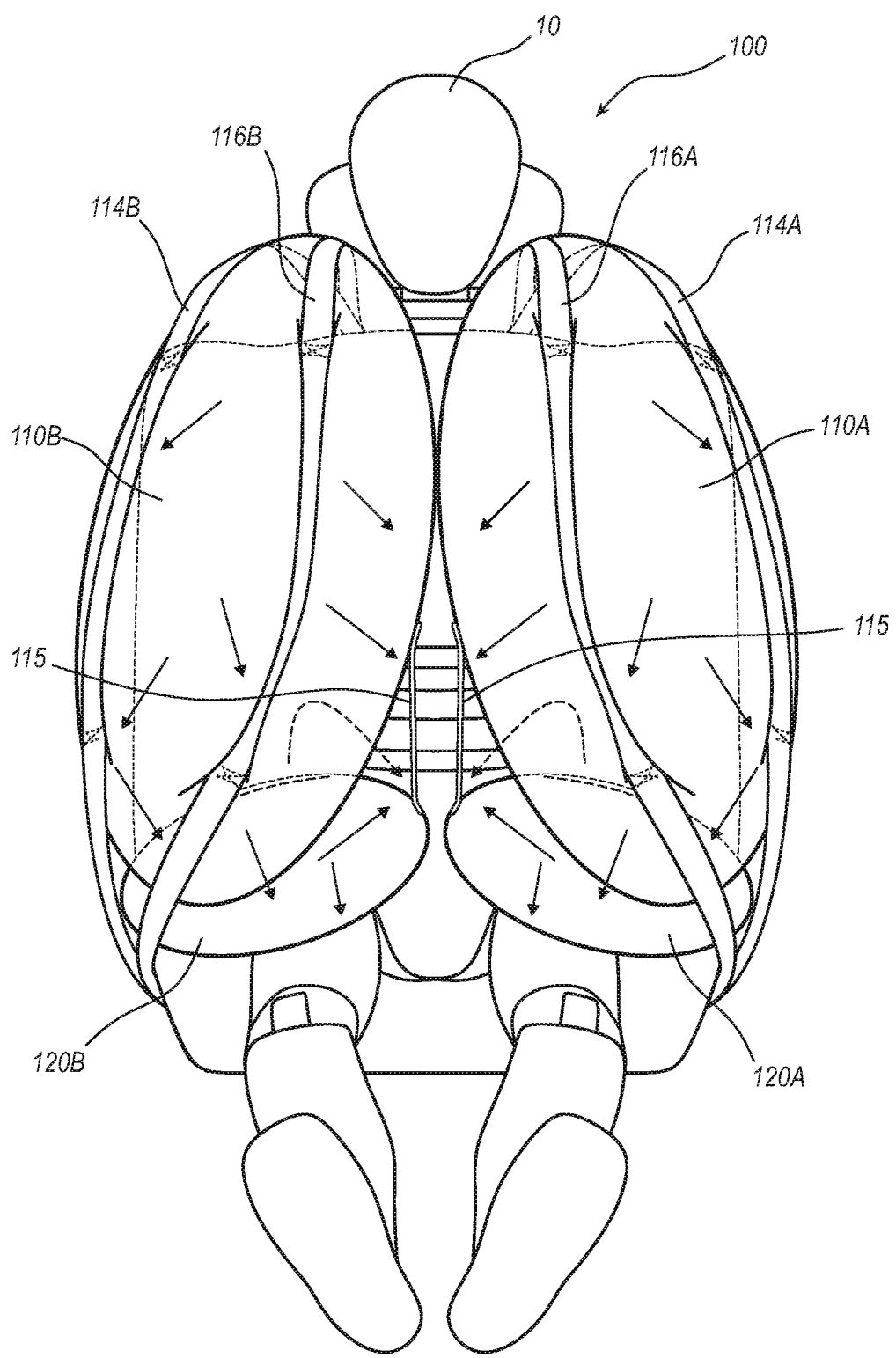
FIG. 3 is a front elevation view of the seat-mounted airbag cushion system following deployment.

As shown in FIG. 3, during deployment, primary chambers 110A and 110B deploy along both sides of the chest of the adjacent occupant 10. Wrap-around belts 114 and 116 may be used to provide a reaction surface to ensure that the adjacent airbag cushions have sufficient tension in the chest region. Examples of wrap-around belts that may be used in one or more of the embodiments disclosed herein can be found in U.S. Patent Application Publication No. 2017/0259774 titled "Vehicle Occupant Restraint Device," the entire contents of which are incorporated herein by reference.

More particularly, on either side of the centerline of occupant 10 and seat 15, there are a pair of belts for facilitating deployment of the primary chambers 110A/110B of system 100. Thus, on the right side of occupant 10 (from the perspective of the figure), a rearward/lower belt 114A extends about an outer/rearward portion of cushion 110A and a forward/upper belt 116A extends about an inner/forward portion of cushion 110A. Similarly, on the opposite side of occupant 10, another pair of belts are provided to maintain a surface for providing tension between the occupant 10 and the adjacent cushion 110B, namely another rearward/lower belt 114B and another forward/upper belt 116B.

Belts 114A/116A and 114B/116B may be, respectively, mounted at opposite ends to the upper rear and lower side portions of seat 15. In some embodiments, both belts on either side may be mounted at the same location or adjacent locations on the seat 15. The belts may be retractably mounted at the top and/or bottom, and may include various pre-tensioners, load limiters, or the like to ensure that they provide a sufficient length to allow proper deployment yet inhibit further retraction to ensure that they maintain tension on the adjacent cushions 110A/110B. In addition, it should be understood that any of belts 114/116 may be coupled to a portion of its respective cushion 110 in order to ensure proper deployment. This coupling may be rigid or may be done by way of a slidable coupling, such as by way of a fabric or webbing loop, slidable clip, or the like.

However, to provide a reaction surface in between occupant 10 and primary chambers 110A/110B and, more particularly, between the upper thighs/pelvis region of occupant 10 and the adjacent primary chambers 110A/110B, secondary/pelvis chambers 120A/120B deploy preferably in a downward and rearward direction to provide increased pelvis restraint to occupant 10. In preferred embodiments, the initial stage of inflation results in inflation of primary chambers 110A and 110B, after which the secondary/pelvis chambers 120A and 120B rotate downward from their initial position, each of which may be folded against its corresponding primary chamber prior to inflation.

While the two secondary/pelvis chambers 120A/120B inflate in a direction both generally towards one another and downward against the upper thigh/pelvic region of occupant 10, the tethers 115 prevent over-rotation of the secondary/pelvis chambers 120A/120B and guide their respective general inflation directions.

Figure 4:
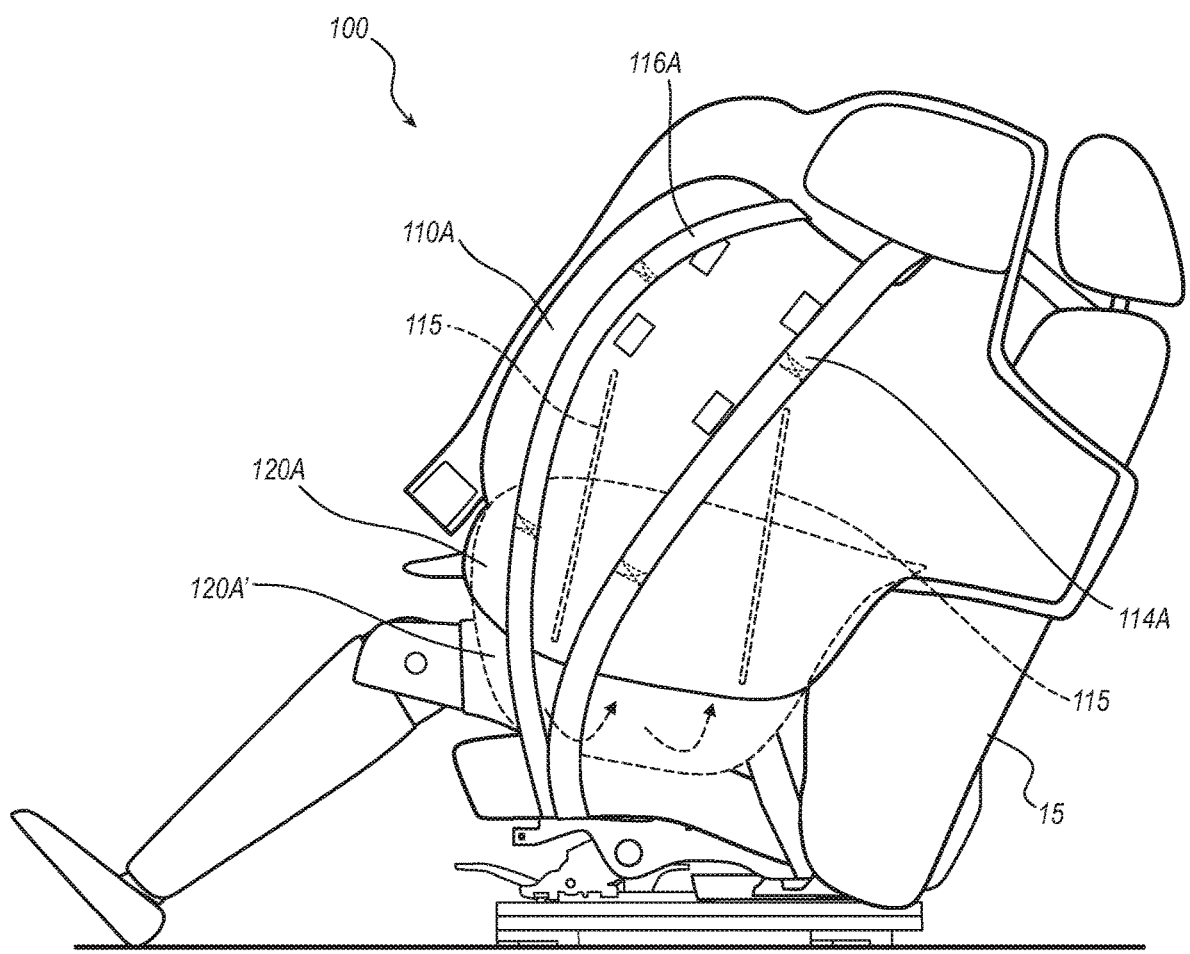
FIG. 4 is a side elevation view of the seat-mounted airbag cushion system following deployment and illustrating a pelvis chamber both before and after inflation.

FIG. 4 is a side, perspective view of airbag system 100 following deployment. As shown in the phantom portion of this figure, prior to inflation, pelvis chamber 120A' rests against the thigh and pelvis region of occupant 10 on both the inner/inboard and outer/outboard sides (only one side is shown in FIG. 4). Pelvis chamber 120A is also shown following deployment, after it has contacted the occupant's pelvis region to provide tension and a reaction surface to keep the occupant from sliding forward in between the two primary chambers 110. As also shown in FIG. 4, tethers 115 extend between primary chamber 110A and pelvis chamber 120A. While not shown in this figure, similar tethers may also be present on the opposite side to guide deployment of the other pelvis chamber.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A method for restraining forward translation of a vehicle occupant during an impact event, the method comprising the steps of:
    deploying a first seat-mounted airbag cushion along a first side of a vehicle occupant;
    deploying a second seat-mounted airbag cushion along a second side of the vehicle occupant; and
    deploying a first pelvis restraint chamber below the first seat-mounted airbag cushion at an angle relative to the first seat-mounted airbag cushion towards a centerline of a seat in which the vehicle occupant is sitting and towards a first upper thigh of the vehicle occupant in front of the vehicle occupant, wherein the first pelvis restraint chamber contacts the first seat-mounted airbag cushion and inhibits forward translation of the vehicle occupant within a vehicle seat.

2. The method of claim 1, further comprising deploying a second pelvis restraint chamber below the second seat-mounted airbag cushion at an angle relative to the second seat-mounted airbag cushion and towards a second upper thigh of the vehicle occupant.

3. The method of claim 2, wherein the first and second pelvis restraint chambers deploy towards one another and towards a respective thigh of the vehicle occupant.

4. The method of claim 1, wherein a single inflator is used to inflate both the first seat-mounted airbag cushion and the first pelvis restraint chamber.

5. The method of claim 1, wherein the step of deploying the first seat-mounted airbag cushion and deploying the second seat-mounted airbag cushion are performed prior to deploying the first pelvis restraint chamber.

6. The method of claim 2, wherein the second pelvis restraint chamber contacts the second seat-mounted airbag cushion and inhibits forward translation of the vehicle occupant within the vehicle seat.

7. The method of claim 1, wherein the first pelvis restraint chamber is fluidly coupled with at least one of the first and second seat-mounted airbag cushions.

8. The method of claim 1, wherein an external tether is coupled between the first pelvis restraint chamber and the first seat-mounted airbag cushion.

9. The method of claim 8, wherein the external tether is configured to direct deployment of the first pelvis restraint chamber at the angle relative to the first seat-mounted airbag cushion.

10. The method of claim 1, wherein the first seat-mounted airbag cushion is deployed against a wrap-around belt.

11. The method of claim 10, wherein the second seat-mounted airbag cushion is deployed against a wrap-around belt.

12. The method of claim 11, wherein the wrap-around belt against which the first seat-mounted airbag cushion is deployed is distinct from the wrap-around belt against which the second seat-mounted airbag cushion is deployed.

13. The method of claim 1, wherein an internal tether is configured to direct deployment of the first pelvis restraint chamber at the angle relative to the first seat-mounted airbag cushion.

14. The method of claim 1, wherein one or more pleats formed along a region joining the first pelvis restraint chamber and the first seat-mounted airbag cushion is used to direct deployment of the first pelvis restraint chamber at the angle relative to the first seat-mounted airbag cushion.

15. The method of claim 14, wherein the one or more pleats are part of a pleated elbow region formed between the first pelvis restraint chamber and the first seat-mounted airbag cushion.

16. The method of claim 1, wherein the first pelvis restraint chamber comprises an inflation chamber of the first seat-mounted airbag cushion.

17. The method of claim 1, further comprising deploying a second pelvis restraint chamber.

18. The method of claim 17, wherein the first pelvis restraint chamber comprises a first tether coupled between the first pelvis restraint chamber and the first seat-mounted airbag cushion.

19. The method of claim 18, wherein the second pelvis restraint chamber comprises a second tether coupled between the second pelvis restraint chamber and the second seat-mounted airbag cushion.

20. The method of claim 19, wherein the first tether and the second tether each comprises an external tether.

\* \* \* \* \*